Dec. 22, 1942.  E. M. GUYER  2,306,054
GLASS HEATING AND WORKING
Filed Feb. 19, 1938   3 Sheets-Sheet 1
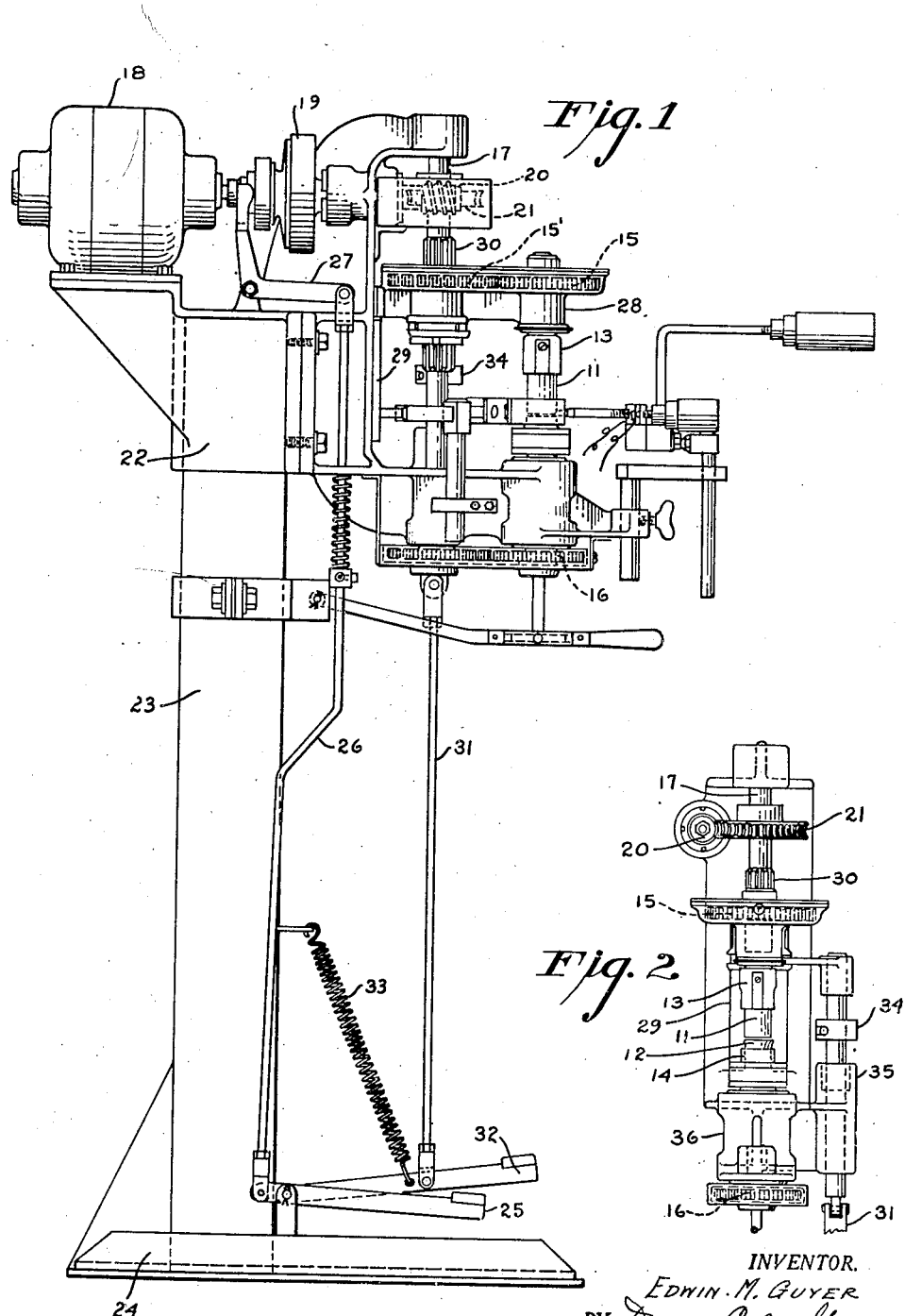
INVENTOR.
EDWIN M. GUYER
BY Dorsey, Cole & Garner
ATTORNEYS.

Dec. 22, 1942.   E. M. GUYER   2,306,054
GLASS HEATING AND WORKING
Filed Feb. 19, 1938   3 Sheets-Sheet 2
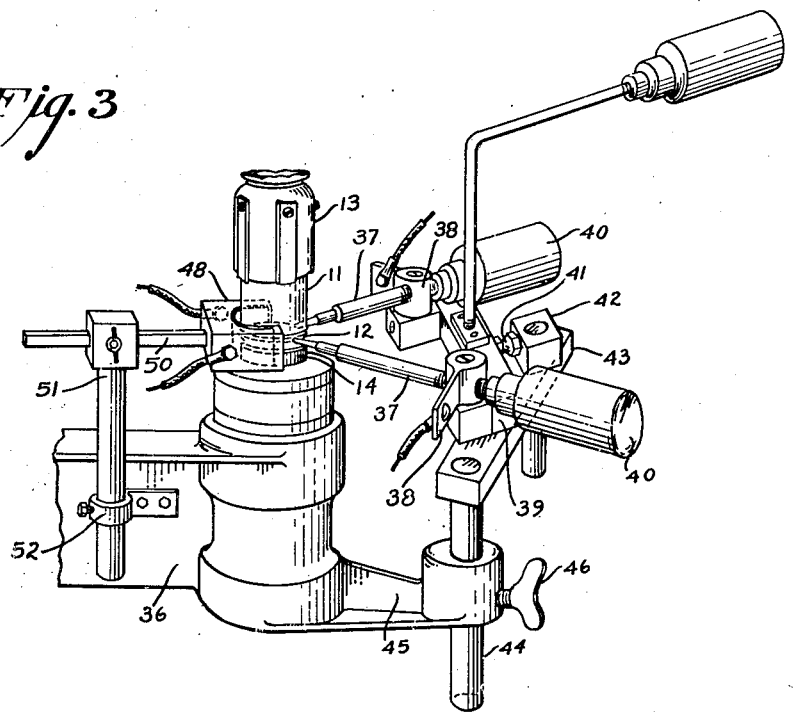
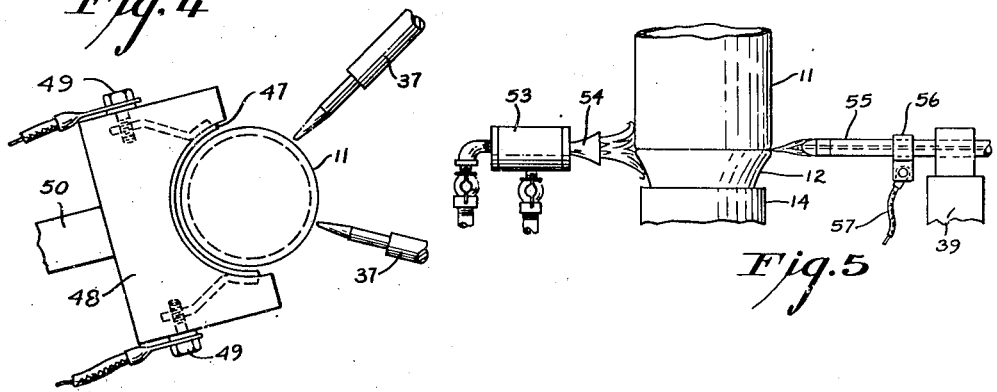
INVENTOR.
EDWIN M. GUYER
BY
ATTORNEYS.

Dec. 22, 1942.   E. M. GUYER   2,306,054
GLASS HEATING AND WORKING
Filed Feb. 19, 1938   3 Sheets-Sheet 3
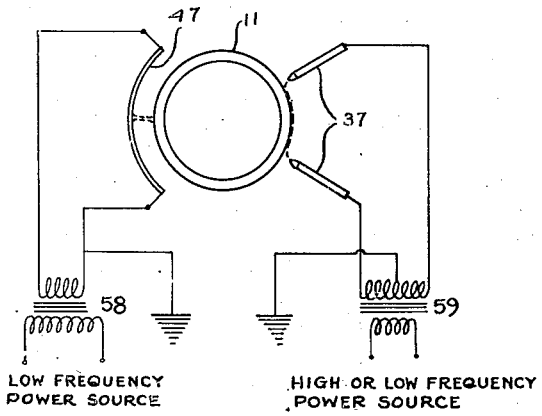
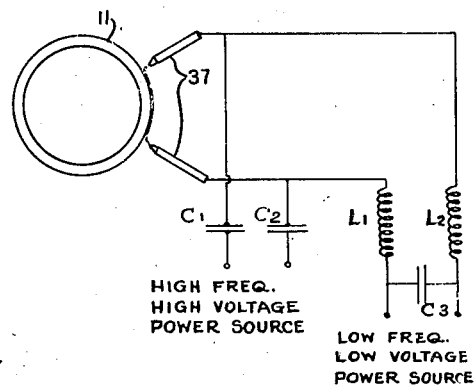
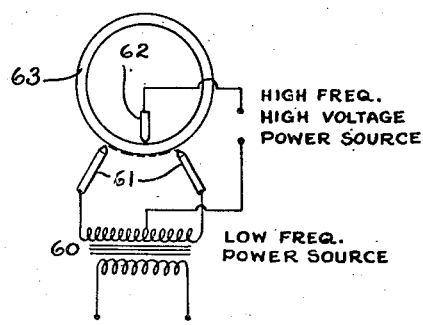
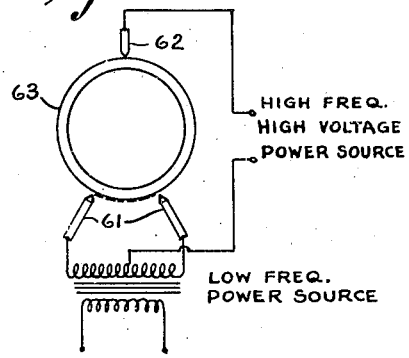
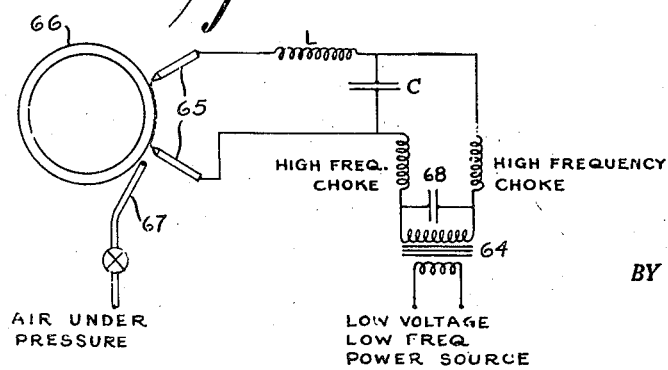
INVENTOR.
EDWIN M. GUYER
BY Dorsey, Cole & Garner
ATTORNEYS.

Patented Dec. 22, 1942

2,306,054

UNITED STATES PATENT OFFICE 2,306,054

GLASS HEATING AND WORKING

Edwin M. Guyer, Corning, N. Y., assignor to Corning Glass Works, Corning, N. Y., a corporation of New York Application February 19, 1938, Serial No. 191,531

22 Claims. (Cl. 49—1)

This invention relates to the working of hard glass bodies and more particularly to means and methods by which glass bodies may be heated in highly localized regions both for sealing to other glass bodies and for separation into a plurality of individual glass bodies.

Since glass is a thermoplastic material its entire history has involved means and methods by which it can be heated and rendered suitable for working. For the most part heat has been generated and applied by burning some combustible substance and bringing the products of combustion into contact with the glass. Various attempts have been made to heat glass by the use of electrically heated metallic containers and various radiating elements. It is well known that glass is a pyro-electrolyte whose resistance decreases with an increase in temperature and attempts have been made to utilize this characteristic for heating purposes by passing a current thru heated glass in melting tanks, feeders and the like. However, due to this very characteristic it is practically impossible to heat glass uniformly since current tends to concentrate in those parts which are hottest thus generating more heat at such points and accentuating the condition.

The present invention is directed to the application of electric conduction heating of glass to such glass working operations as the sealing together of glass parts and the cracking off of one glass part from another, and has for its object the uniform and regulated application of electrical heat to predetermined limited areas of glass bodies.

More particularly it is the object of this invention to conduct regulated currents of electricity thru predetermined paths in a glass article or in close proximity thereto in such manner and to such an extent that temperatures will be developed in the glass along these paths which will soften the glass so that it may be sealed to another article or otherwise worked as desired, or will heat the glass so rapidly as to cause differential internal strains along these paths which will cause fracture of the glass thereon.

A further object of this invention is a suitable electrical source from which may be drawn currents of sufficient voltage and amperage to heat the desired article to the desired temperature.

The means by which the above objects may be obtained are hereinafter fully described and illustrated in the drawings in which:

Fig. 1 is a side elevation of a device for sealing tubular glass parts together;

Fig. 2 is a front elevation of a portion of the machine of Fig. 1;

Fig. 3 is a perspective detail of the chucks, zone heater and sealing electrodes of the machine of Fig. 1;

Fig. 4 is a detailed plan view showing the relationship of the zone heater and electrodes to the work and to each other;

Fig. 5 is a detailed elevation showing a gas fired zone heater and gas electrodes substituted for the equivalent elements of Figs. 1-4;

Fig. 6 is a circuit diagram showing a suitable power supply circuit for use with the heater and electrodes of Figs. 1-4;

Fig. 7 is a circuit diagram showing a two frequency power supply circuit;

Fig. 8 is a circuit diagram of a power supply including means for controlling the path of the spark discharge;

Fig. 9 shows a modified application of the circuit of Fig. 8; and

Fig. 10 is a self oscillating high frequency, high voltage circuit for use with a device of the present invention.

It has long been known to those skilled in the art that glass can be heated by passing a current therethru once it has been heated to a sufficient temperature. Actually several factors beside temperature have a part in determining whether or not glass will conduct electricity. These are the voltage and frequency of the impressed potential, the wave shape, if an alternating potential be used, and the composition and geometry of the piece of glass. This conduction is entirely apart from the disruption of glass at high voltages by puncture. As the frequency of a given impressed voltage goes up it becomes increasingly easy to pass a current of electricity through the glass. Advantage may be taken of this phenomena by lowering the impressed voltage or operating on glass at a lower temperature. Accordingly, it is possible to strike directly into glass at room temperature if sufficiently high frequencies and voltages are employed, but sources of such potentials are difficult and costly to provide and it is usually preferable to locally heat the glass through which it is desired to pass a current to lower the frequency and voltage relationship at which it will become conducting.

The fact, that glass must first be heated by some auxiliary means before it will become conducting at most available voltages and frequencies, has materially limited the application of heating by electrical conduction in the glass working art. Such few applications as have been made have been confined primarily to furnaces but there the tendency of current to channel along the already hottest paths has proved a major obstacle. In the present invention this tendency of the current to flow along the hottest paths has been utilized to create hot zones in glass of very restricted area. In order to render the glass conducting, it is first heated by passing a spark discharge between two electrodes along the surface of the glass in the region where it is desired to form the hot stripe. This heating may be supplemented by a more general zone heater such as a radiating resistance element or a gas flame. While such a spark between two electrodes should follow a straight path it is subject to the slightest movement of the surrounding air, whether caused by its own heat or extraneous drafts and generally wavers over a band of considerable width. For this reason, and because of the previously noted channeling effect of electric currents in glass, if it is desired to uniformly heat the edges of two glass articles to seal them together or to cut off a tube or tumbler with a straight true line, it is necessary to space the electrodes fairly close together and so manipulate the glass parts as to pass the line which it is desired to heat along the line of the electrodes. In this way the minor fluctuations of the spark are averaged and the article or articles will be heated along a straight line. As the glass along this line is raised in temperature its resistance is lowered until it becomes less than the air gap across its surface at which time it commences to carry current. From this point on, heat is developed in the glass very rapidly since as the temperature goes up the current increases, and heat is developed as a function of the square of the current. If the articles being heated are moved with sufficient rapidity past the electrodes a hot band of substantially uniform temperature is developed about the entire circumference. Uniformity of heating may be further promoted by placing other electrodes along the heated stripe which may either be grounded or connected to additional power sources. In this way currents may be made to flow simultaneously thru all or a considerable part of the heated stripe.

The process of heating glass has many advantages over any hitherto known in the art. It is far more rapid than any form of convection, radiation or conduction heating in which heat is developed in some external source and transmitted to the glass. Rates of temperature rise as high as 1000° C. per second are easily possible. Yet this heat is transferred to the glass without use of any extraneous object which would tend to mar the surface or displace the molten glass or stick thereto. Furthermore, altho the sparks impinge on the glass they have substantially no mass and have no tendency to splatter or blow away the glass, such as is inherent in needle flame gas burners even when applied to a most restricted area. Due to the simultaneous generation of heat all along the path of current flow it is possible to obtain uniform temperature conditions thruout the entire heated stripe and so eliminate hot spots and boiling.

A further advantage of this type of heating is that the maximum temperature to which the glass is raised may be easily and accurately controlled. This may be accomplished by the use of certain regulating mechanism in the power circuits but may be obtained to a considerable extent merely by adjustment of the setting of the electrodes. This is due to the fact that at elevated temperatures the resistance of the hot glass stripe drops to such a low value as to be negligible in comparison with reactance of the gap between the glass and the electrodes so that the maximum current which can be delivered from a given power source is directly determined by the spacing of the electrodes.

While satisfactory results may be obtained in the majority of instances by using a simple spark discharge from solid electrodes to the glass as the means of passing current into and out of the glass it has been found that the finest and most accurate control of the location of the heated area can best be obtained by using needle flames as gaseous conductors over which the electric discharge passes to an exact spot on the surface of the article. Such flame electrodes are particularly useful where electrical heating is utilized in cracking off or burning off the moil from bulbs, tumblers or the like, or the cutting of tubing and cylinders. In such an application relatively low velocity needle flame burners are positioned on insulated supports so that the flame points are just in contact with the glass surface. When a sufficiently high electrical potential is established between these burners to break down the air gap between them the discharge follows the hot gas to and from the glass surface using it as a flexible gaseous conductor or electrode. Not only are such gas electrodes useful in accurately locating the discharge to the glass but they also aid in heating and establishing the conducting path on the surface of the glass. Such displacement of the molten glass as takes place in burn off operations is unimportant and if it is desired to use such electrodes in sealing operations small, low velocity burners may be used since their heating capacity is of relatively small importance.

The particular glass working machine disclosed in Fig. 1 is designed to seal a blown glass lamp envelope 11 to a pressed glass base 12. These glass parts are held respectively by chucks 13 and 14 which are rotated at identical speeds by gear trains 15 and 16 from shaft 17. This shaft in turn is driven by a variable speed electric motor 18 thru a clutch 19, worm gear 20 and pinion 21. The entire assembly is mounted on a frame 22 which is supported by a column 23 and base 24. A foot pedal 25 mounted on the base 24 operates clutch 19 thru a rod 26 and bell crank lever 27 connecting and disconnecting the motor 18 and the chuck driving mechanism.

The bulb holding chuck 13 and its gear train 15 are assembled in a housing 28 which is supported from a slide 29 on frame 22 for relative movement with respect to chuck 14. Gear 15 is positively driven, despite this movement, by splines 30 on shaft 17. The housing 28 is controlled by a rod 31 and foot pedal 32 which are normally maintained in an elevated position by spring 33. The lower limit of movement of the housing and chuck is controlled by a stop 34 which contacts with the sleeve 35 on base casting 36.

The heater and electrodes by which the sealing of the glass parts is accomplished are mounted on brackets formed as a part of the base casting 36. The electrode assembly, which is shown in more detail in Fig. 3, consists of a pair of metallic rods 37, screw threaded into terminals 38 which are pivotally mounted on the ends of an insulating support 39. Insulating handles 40 are provided for manipulation of the individual electrodes. The assembly as a whole is adjustable about a horizontal pin 41 extending from fixture 42 which is pivoted in the end of an insulating arm 43. This arm is mounted on pin 44 which is held in vertical adjustment in boss 45 by set screw 46. The space heater shown in conjunction with these electrodes consists of a resistance band 47 mounted on a block of insulation 48 and is provided with suitable terminals 49 for connection with an electrical power supply. The mutually adjustable rods 50 and 51 and bracket 52 permit proper spacing of the heater with respect to various types of work.

In Fig. 5 is shown, more or less diagrammatically, the substitution of gas burners for the electrodes and space heater of Figs. 1-4. In this arrangement of a typical gas burner 53 equipped with a fish tail tip 54 applies a relatively low temperature flame to the bulb 11 and base 12 for a considerable distance back from their contacting edges. In place of the metallic electrodes there are provided a pair of needle flame burners 55 which are preferably provided with gases having a high rate of flame propagation such as oxygen and hydrogen. These burners are mounted on the insulating support 39 in much the same manner as electrodes 37 and are provided with suitable terminals 56 and lead wires 57 so that an electrical potential may be established therebetween. Similar connections may be made with burner 53 if desired.

In the operation of the above described device as a sealing machine, glass parts of the desired configuration are placed in axial alignment in the chucks 13 and 14 and rotated simultaneously while the housing 23 is lowered by depressing pedal 32 until their edges are close together. In this position the edge portions are subjected to the gentle heating action of the radiant space heater 47 or the wide flame from burner 53. This heat is insufficient to soften the glass but forms a gradual temperature gradient in the glass which prevents its fracture when the sealing heat is applied along the adjacent edges. After suitable preliminary heating from this source intense heat is generated locally in the edge of at least one of the glass parts by passing an electric current therethru. As the glass melts the edges are brought into contact and sealed together, the heating current being maintained during the sealing operation. The amplitude of this heating current is controlled by the position of the electrodes and by the characteristics of the circuits by which this current is supplied.

A simple power supply circuit for the electrodes 37 and 47 is shown diagrammatically in Fig. 6. In this arrangement the space heater 47 is shunted directly across the low tension winding of a transformer 58 connected to a conventional power source such as a 440 volt, 60 cycle line. Spark electrodes 37 are connected directly to a high voltage power source of either high or low frequency which as shown may be the high tension winding of an air core transformer 59 whose secondary is connected to a source of high frequency power such as a standing wave oscillator having a frequency of the order of 1 megacycle. In order to produce a heating effect thruout the circumference of the bulb 11 one side of the space heater circuit is grounded, as is the mid point of the high tension winding. In this way a potential difference is created between each of the electrodes 37 and space heater 47 which causes a flow of current between the electrodes once the temperature of the glass is raised sufficiently. This same circuit may be readily adapted to the gas burners of Fig. 5. Under such circumstances burners 55 may be connected to transformer 59 whose midpoint tap will then be connected to burner 53.

In Fig. 7 is illustrated an alternative circuit which has been found desirable as a source of power for the heating electrodes. In this circuit a high voltage, high frequency potential of the order of magnitude of 10 k. v. and 1 megacycle is impressed on the electrodes thru condensers $C_1$, $C_2$ which are of approximately 2000 m. m. f. capacity. The setting of electrodes 37 is such that when this high voltage, high frequency potential is impressed thereon the air gap between them is broken down and a spark forms along the edges of the rotating glass parts. In a very few seconds this spark heats the rims of one or both of the glass parts to a temperature at which it is conducting and the spark breaks directly to the surface of the glass in alignment with the electrode. While high frequency potentials are extremely useful in forming the spark between the electrodes and to glass such potentials are difficult to create with equipment having high power capacity. Thus while it is relatively easy to establish a potential which will break into the warm glass, it is extremely expensive to obtain such a potential source of sufficient power to heat any sizeable body of glass to the melting point. For this reason a second potential of lower frequency and voltage and generated by a sufficiently powerful source may be impressed on the same electrodes 37 to supply the bulk of the current necessary to heat the entire volume of glass to melting temperature. In Fig. 7, this power source may be of the order of 1000 volts and 60 cycles in which case it may be connected to the electrodes thru inductances $L_1$ and $L_2$ which act as high frequency choke coils preventing flow of current from the high voltage high frequency source into the low frequency system. Should any such high frequency current pass thru the choke coils a bridging condenser $C_3$ is provided thru which it may discharge. In the particular circuit disclosed the inductances may be of a value of 8 millihenrys while condenser $C_3$ should be in the neighborhood of .1 microfarad.

While the simple application of sufficient voltage to electrodes 37 will produce a spark between them, the passage of this spark across the glass heats not only the glass but the surrounding air as well and tends to cause the spark to blow out away from the glass, thus materially lessening its effectiveness and increasing the period of time before it strikes into the glass and conduction heating begins. To overcome this tendency it has been found desirable to impress a higher voltage on an electrode positioned midway between the spark electrodes and on the opposite side of the glass. Where the configuration of the glass parts beieng worked on permits, it is desirable to position the high voltage pilot electrode immediately opposite the arc and separated therefrom merely by the glass being heated. Such an arrangement is shown diagrammatically in Fig. 8. In this circuit the high tension secondary of the transformer 60 is connected to spark electrodes 61 while its primary is connected to a high capacity power source. A separate high voltage circuit is tapped into the midpoint of the transformer and connected to the pilot electrode 62 positioned inside the tube 63 midway between the electrodes. This potential tends to draw the arc against the surface of the tube and, after it has struck into the glass itself causes a secondary heating current to flow thru the glass. Where the configuration of the glass parts does not permit access to the interior wall the pilot electrode may be positioned on the opposite side of the article as shown in Fig. 9. While the electrostatic effect on the arc is materially reduced in this position it is nevertheless beneficial and as the glass becomes conducting current flows to this electrode giving positive resistance heating of the glass thruout the circumference of the article. This same heating effect is produced in the device shown in Fig. 4 by grounding one side of the band heater circuit and a point in the supply circuit to electrodes 37 as shown in Fig. 6. As the glass becomes conducting it will be found that the air gap to band heater 47 breaks down and current flows from one or both of the electrodes 37 to the resistance 47 as well as between the electrodes 37. In lieu of the electrostatic field established as described above, the discharge may be forced against the glass by a properly synchronized magnetic field.

Various circuits have been described above in which high frequency potentials have been utilized in heating glass articles alone or in combination with lower frequency potentials. While numerous devices are available to supply high frequency potentials all of these are notoriously inefficient, heat losses often accounting for as much as 50% or more of the input power. In spark oscillators the major part of this energy loss occurs in the spark itself. In order to raise the operating efficiency of the present glass working device a supply circuit has been devised in which the spark from the electrodes to the glass is used to energize the circuit which supplies the major portion of the heating current. This circuit is shown in detail in Fig. 10. In this circuit power is drawn from a typical commercial source such as 60 cycle current at 440 volts. As shown, the line voltage is stepped up to a much higher value, conveniently 20,000 volts, in a transformer 64 of relatively low capacity, that is from 5-20 k. v. a. When the secondary of the transformer is connected to the glass working electrodes 65 spaced from ½" to 1" apart, a spark will be drawn between the electrodes along the surface of the glass body 66. Such a spark will heat the glass surface sufficiently to render it conducting at 20,000 volts but since the capacity of the transformer is limited the current which will flow is insufficient to raise the glass to melting temperature. For this reason inductance L is inserted in the circuit and connected in series with the electrodes by capacity C. So arranged the inductance, capacity and electrodes form a resonant circuit thru the spark. To prevent this spark from constituting a permanent short circuit conductor across capacity C an air blast is directed against at least one of the electrodes from a suitable source 67. This blast of air functions to interrupt the spark discharge and permit charging of the capacity C by the transformer voltage. As the spark reforms an oscillatory discharge occurs across the electrodes thru the L and C circuit. By making L of a sufficiently low value this oscillatory surge may have a peak current value many times that which can be drawn from the transformer. The frequency of this discharge can be varied at will by proper choice of values for L and C but may desirably be on the order of .5 to 10 megacycles. Thus the oscillatory discharge not only provides high amperage surges having high heating ability but provides them at a frequency which will promote strike-in to the body of the glass. Radio frequency chokes may be positioned in the lines leading to the power transformer secondary to prevent destructive high frequency surges thru this equipment which may be further protected by bridging condenser 68. In place of the air blast, quenching of the spark may be conveniently effected by means of a properly positioned and synchronized electromagnetic field.

Altho the present invention has been described in connection with certain specific apparatus and circuits, it is to be understood that these are disclosed by way of illustration and various equivalent structures may be substituted in commercial practice. For example, alternators and generators of the proper frequency and capacity may be directly connected to the various electrodes and burners in place of the transformers illustrated in the circuit diagrams. Accordingly it is to be understood that the invention is to be limited only by the scope of the appended claims.

The term "hard glass" as used in the appended claims refers to the viscous condition of the glass rather than to its chemical composition.

I claim:

1. The method of working hard glass bodies which comprises introducing a current of electricity into a glass body from an external source spaced from said body, and simultaneously establishing relative motion between said body and said source.

2. The method of working hard glass bodies which comprises introducing a current of electricity into said body from an external source spaced from the surface of said body, passing a current of electricity thru said body along a predetermined path in the surface thereof, and continuously moving said body so as to bring a series of points on its surface sequentially into said path.

3. The method of heating a restricted section of a hard glass article which comprises establishing an electrical potential difference between two points adjacent to but spaced from the surface thereof, passing an electrical discharge along the surface of the glass between these points to raise the temperature of the adjacent glass, and passing a current of electricity thru the glass between said points along the line of the surface discharge.

4. The method of heating a restricted section of a hard glass article which comprises establishing an electrical potential difference between two points adjacent the surface thereof, locally heating the surface of the body between said points to render a restricted path in the glass conducting, passing an electric current thru the glass between said points along said path and continuously moving said article so that points on its surface advance from one point toward the other during the heating operation.

5. The method of heating a restricted section of a hard glass article which comprises rotating the article, applying needle flames of low calorific value at spaced points to the surface of the article, and establishing a potential difference between said needle flames sufficient to cause an electric current to flow thru the glass between said flames and melt the same.

6. The method of joining hard glass parts which comprises aligning said parts with their edges in spaced relationship, subjecting said edges and the glass adjacent thereto to radiant heating, passing a current of electricity thru at least one of said edges to raise the same to sealing temperature and bringing said edges together to effect a seal.

7. The method of joining hard glass parts which comprises assembling said parts in aligned, spaced relationship, establishing a diminishing temperature gradient in said glass parts from the edges to the bodies thereof, passing a current of electricity thru one of said edges to further heat the same, bringing said edges together while the current is flowing and passing a current of electricity thru said second edge to further heat the same and seal said edges together.

8. The method of joining hard glass parts which comprises aligning said parts with their edges in spaced relationship, subjecting said edges and the glass adjacent thereto to radiant heating, passing a current of electricity thru at least one of said edges to raise the same to sealing temperature and bringing said edges together to effect a seal, said radiant heating being maintained thruout the subsequent heating operations.

9. The method of heating a restricted area of a hollow glass body which comprises locally heating said area to render it conducting, establishing a plurality of electrical potentials at spaced points along the surface of said body and simultaneously passing a plurality of electrical currents thru contiguous sections of said body under the influence of said potentials.

10. In a device for working hard glass bodies, rotatable means for aligning and holding a pair of glass bodies, means for heating the adjacent edges of said bodies and contiguous portions thereof, means for applying a localized source of heat to one of said edges, and means for moving said glass bodies axially with respect to each other, said localized source of heat comprising at least two electrodes so positioned that their tips are slightly spaced from said body edge and means for effecting an electrical discharge between said electrodes.

11. In a device for working hard glass bodies, means for positioning a pair of glass bodies in alignment, with their edges adjacent to one another, means for simultaneously rotating said bodies, a space heater located adjacent the edges of said bodies and means for establishing a potential difference between spaced points on one of said edges.

12. In a device for working hard glass, means for holding a glass body, a pair of electrodes terminating adjacent the surface of said body, means for creating a spark discharge between said electrodes across a portion of said body, a space heater adjacent another portion of said body, and means for maintaining said space heater at a different potential from either of said electrodes.

13. The method of working hard glass bodies by heating to softness a restricted stripe thereon which comprises introducing a current of electricity into a glass body at one point in the path of the desired stripe, withdrawing it therefrom at another point in said stripe, and simultaneously establishing relative motion between said body and said points so as to bring the entire length of said stripe sequentially and repeatedly between said points.

14. The method of working hard glass bodies by heating to softness a restricted stripe thereon which comprises introducing a current of electricity into a glass body of revolution at one point, withdrawing it therefrom at another point on the periphery of the body, and simultaneously rotating said body about its axis of revolution to cause successive portions of its periphery to occupy the space between said points.

15. The method of working hard glass bodies which comprises rotating a glass body, applying spaced gas flames to the surface of the body while it is rotating to heat a stripe thereon and simultaneously establishing a potential difference between said flames sufficient to effect an electrical discharge through said glass body along said stripe.

16. The method of working glass bodies which comprises successively sweeping a restricted path on the surface of a glass body with a plurality of controlled gas flames and simultaneously effecting an electrical discharge in said glass body along the path between spaced points on said restricted path.

17. The method of working glass which comprises impinging a plurality of gas flames against a glass body, moving said body with respect to said flames to heat a restricted area thereof and passing a current of electricity along said flames and through said restricted area while maintaining said flames in contact with said body.

18. The method of working a hard glass body which comprises rotating said body and simultaneously subjecting a limited path along its surface to a source of radiant heat to heat said path and render it conducting and thereafter passing a current of electricity through said glass along said path while continuing the rotation of said article.

19. In a device for working hard glass bodies, means for supporting a body to be worked, means for heating a portion of said body to render it conducting, a plurality of spaced electrodes adjacent to but spaced from the heated portion of said body, means for establishing potential differences between said electrodes, and means for continuously moving said body to bring selected portions of its surfaces periodically between said electrodes.

20. In a device for working hard glass bodies, means for supporting a body to be worked, a space heater positioned adjacent said body, means for establishing relative movement between said space heater and said body, and secondary heating means positioned adjacent said body and said space heater and adapted to apply additional heat to a restricted portion of the surface of the glass body in alignment with said space heater, said secondary heating means comprising a plurality of electrodes having their tips close to but spaced from said body, and means for establishing a potential difference between adjacent electrodes sufficient to cause an electric current to flow thru the glass between said electrodes.

21. The method of working hard glass bodies by heating to softness a restricted stripe thereon which comprises introducing a current of electricity into a glass body at one point in the path of the desired stripe, withdrawing it therefrom at another point in said stripe and progressively and sequentially changing the location of the points along said stripe at which the current is introduced and withdrawn so as to cause said current to flow sequentially through all portions of said stripe until the entire stripe has been heated to the desired temperature.

22. The method of working hard glass bodies by heating to softness a restricted stripe thereon which comprises introducing a current of electricity into a glass body at one point in the path of the desired stripe, withdrawing it therefrom at another point in said stripe, progressively and sequentially changing the location of the points along said stripe at which the current is introduced and withdrawn so as to cause said current to flow sequentially through all portions of said stripe and continuing to change the location of the points along said stripe at which the current is introduced and withdrawn in such manner as to bring the same portion of the stripe repeatedly between said points until the entire stripe has been heated to the desired temperature.

EDWIN M. GUYER.